(12) United States Patent
Ehrmaier

(10) Patent No.: US 7,496,431 B2
(45) Date of Patent: Feb. 24, 2009

(54) ROLLING AWAY PROTECTION AFTER ENGINE SWITCH OFF AND SECURITY DEVICE

(75) Inventor: Rudolf Ehrmaier, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 11/131,308

(22) Filed: May 18, 2005

(65) Prior Publication Data

US 2005/0266958 A1 Dec. 1, 2005

Related U.S. Application Data

(63) Continuation of application No. PCT/EP03/10840, filed on Sep. 27, 2003.

(30) Foreign Application Priority Data

Nov. 19, 2002 (DE) .................. 102 53 936

(51) Int. Cl.
*G06F 7/00* (2006.01)
*G06F 17/00* (2006.01)
*B60R 25/04* (2006.01)
*B60R 25/06* (2006.01)

(52) U.S. Cl. .............. 701/1; 701/54; 701/112; 307/10.3; 340/426.11; 340/426.36

(58) Field of Classification Search .......... 701/1, 701/29, 31, 32, 33, 34, 35, 36, 54, 45, 49, 701/76, 70, 93, 95, 97, 99, 112, 114, 115; 307/9.1, 10.1, 10.2, 10.3, 10.6; 340/425.5, 340/426.1, 426.11, 426.16, 426.17, 426.35, 340/426.36, 426.3, 438, 441, 456, 430

See application file for complete search history.

(56) References Cited

U.S. PATENT DOCUMENTS

| 5,293,160 | A | * | 3/1994 | Kurozu et al. | 340/5.3 |
| 5,801,614 | A | * | 9/1998 | Kokubu | 340/425.5 |
| 5,990,785 | A | * | 11/1999 | Suda | 340/426.21 |

(Continued)

FOREIGN PATENT DOCUMENTS

DE     198 15 676 A1    10/1999

(Continued)

OTHER PUBLICATIONS

International Search Report, dated Jan. 1, 2004.

(Continued)

*Primary Examiner*—Jack W Keith
*Assistant Examiner*—Edward Pipala
(74) *Attorney, Agent, or Firm*—Crowell & Moring LLP

(57) ABSTRACT

In order to satisfy the key interlock regulation in a system for keyless starting of a motor vehicle by an ID transducer carried by the vehicle user and a control element (2) for starting and stopping the engine, a mechanism is provided such that the engine can only be stopped when the gear position "P" for Park is engaged but the engine can be stopped at a vehicle speed (v) equal to or greater than a preset threshold speed (v-threshold) without the gear position "P" for Park being engaged, so that the driver can turn off the engine in emergencies even while driving.

8 Claims, 4 Drawing Sheets

U.S. PATENT DOCUMENTS

| | | | |
|---|---|---|---|
| 6,034,617 A | * 3/2000 | Luebke et al. | 340/5.62 |
| 6,133,827 A | * 10/2000 | Alvey et al. | 340/438 |
| 6,323,565 B1 | * 11/2001 | Williams et al. | 307/10.1 |
| 6,639,511 B2 | * 10/2003 | Haruna et al. | 340/426.13 |

FOREIGN PATENT DOCUMENTS

| | | | |
|---|---|---|---|
| DE | 198 39 349 C1 | 4/2000 |
| DE | 198 48 375 C1 | 5/2000 |
| DE | 100 23 063 A1 | 12/2001 |
| DE | 100 28 350 A1 | 12/2001 |

OTHER PUBLICATIONS

German Search Report dated Jul. 11, 2003, and English Translation.

* cited by examiner

ROLLING AWAY PROTECTION AFTER ENGINE SWITCH OFF AND SECURITY DEVICE

BACKGROUND AND SUMMARY OF THE INVENTION

The present application is a continuation of International Patent Application No. PCT/EP03/10840, filed on Sep. 27, 2003, and claims priority under 35 U.S.C. § 119 to German Application No. 102 53 936.7, filed Nov. 19, 2002. The entire disclosure of the aforementioned documents is herein expressly incorporated by reference.

The present invention relates to a procedure for preventing a motor vehicle from moving after the engine is turned off, as well as corresponding safety equipment for a motor vehicle.

In particular, the present invention involves the requirements resulting from the key interlock regulation under Federal Motor Vehicle Safety Standards (FMVSS) No. 114. This regulation states, among other things, that the ignition key must only be removable in motor vehicles with automatic transmissions if the gear-select lever of the automatic transmission is in the "P" for Park position. This is intended to prevent the driver from leaving the vehicle without having first made sure that the vehicle cannot accidentally move. In order to satisfy this regulation, the ignition switch can have suitable mechanical locking mechanisms which can be activated via the ignition key.

Increasingly, however, motor vehicle access systems and starting systems have no mechanical ignition. Such keyless mechanical starting systems with no mechanical ignition include an identification transducer (ID transducer) to be carried by the vehicle user, as well as a device for starting and stopping the engine. As soon as the ID transducer is identified inside the vehicle, it is authenticated through a question-and-answer dialog between the ID transducer and a transceiver unit, and positive authentification proving the ID transducer is authorized for use of the vehicle, enables the engine to be started after the starting device is activated.

The ID transducer can be designed as a key, but has no key bit and is only an "electronic" key. The ID transducer is introduced into a receptacle in the vehicle by the user just like a key before the vehicle is started. In order to meet the key interlock requirement cited above, measures are proposed to lock the ID transducer in the receptacle if the vehicle is not in the "P" for Park position.

The latest developments, however, no longer require the ID transducer to be introduced into the receptacle at all to start the engine. Instead, the electronics in the vehicle determine the presence of the ID transducer inside the vehicle, and perform the necessary authentification regardless of whether the ID transducer is in the receptacle. The corresponding new developments are known as "comfort access" or "keyless go".

In the case of these new systems, the key interlock regulation can no longer be complied with by locking the ID transducer since the ID transducer no longer has to be in a corresponding receptacle for the vehicle to be driven. Other approaches are now required for a solution.

One approach consists of taking steps so that the driver cannot turn off the engine if the gear position "P" for Park is not engaged. This measure makes sure in fact that the driver will not normally leave his vehicle without having made sure that it cannot move, by engaging the gear position "P". The key interlock regulation is thereby met.

This solution has the drawback, however, that the engine cannot be turned off even in certain danger situations or in situations which the driver thinks are dangerous, such as when, for example, problems occur with the engine while driving, the gas pedal sticks or the like.

The present invention is therefore directed to a solution for satisfying the key interlock regulation when keyless starting systems are used in which ID transducers can be located anywhere in the vehicle without a preset physical connection to other parts of the vehicle, and the driver can still turn off the engine in danger situations while driving.

According to the present invention it is possible to turn off the engine even while driving if the speed of the vehicle is greater than a certain threshold speed. Below the threshold speed, the vehicle must first be brought to a stop and Park position "P" must be engaged before the engine can be turned off. As a rule and with proper operation, the driver and ID transducer cannot leave a vehicle whose engine is turned off without first having engaged the Park position. This satisfies the key interlock regulation. In an emergency, however, the driver can also switch off the ignition while driving if the driver deems this necessary. If such an emergency occurs below the threshold speed, the driver can rapidly and safely brake the vehicle to a stop and then engage Park position "P" if necessary and turn off the engine.

The threshold speed should of course be high enough for there to be no fear of misusing the engine turn-off function in a moving vehicle. In accordance with exemplary embodiments of the present invention, the threshold speed can be approximately 15 kilometers per hour.

Another preferred embodiment of the present invention also allows the engine to be turned off regardless of the selected gear position and regardless of the threshold speed of the vehicle if the vehicle's own controls detect an engine problem. This measure is expedient and does not violate the key interlock regulation.

BRIEF DESCRIPTION OF THE DRAWING FIGURES

The invention is explained in greater detail below by means of the diagram.

DETAILED DESCRIPTION

The initial situation is the situation in which the driver is in the vehicle, the ignition is switched on and the engine is running (Step 1). The driver then activates the control element with which the engine can be stopped or the ignition can be switched off (Step 2).

The vehicle's own controls now ascertain the current driving speed v of the vehicle and compare this speed with the preset threshold speed $v_{threshold}$, (Step 3). If the current driving speed v is equal to or greater than the preset threshold speed $v_{threshold}$ ("Yes" path out of decision step 3), the engine and ignition are allowed to be turned off (Step 6).

If the current driving speed is not greater than the threshold speed ("No" path out of decision step 3), the status of the gear position "P" for Park is checked (Step 4). If the gear position for Park is engaged ("Yes" path out of decision step 4), the engine and ignition can be turned off (Step 6).

If the gear position "P" for Park is not engaged, it is determined in 5 whether there is an engine problem (Step 5). If there is an engine problem ("Yes" path out of decision step 5), the engine and ignition can be turned off (Step 6). If no engine problem is detected ("No" path out of decision step 5), the engine and ignition cannot be turned off and the engine and ignition can only be turned off if the gear position "P" for Park has been engaged.

Figure 1:
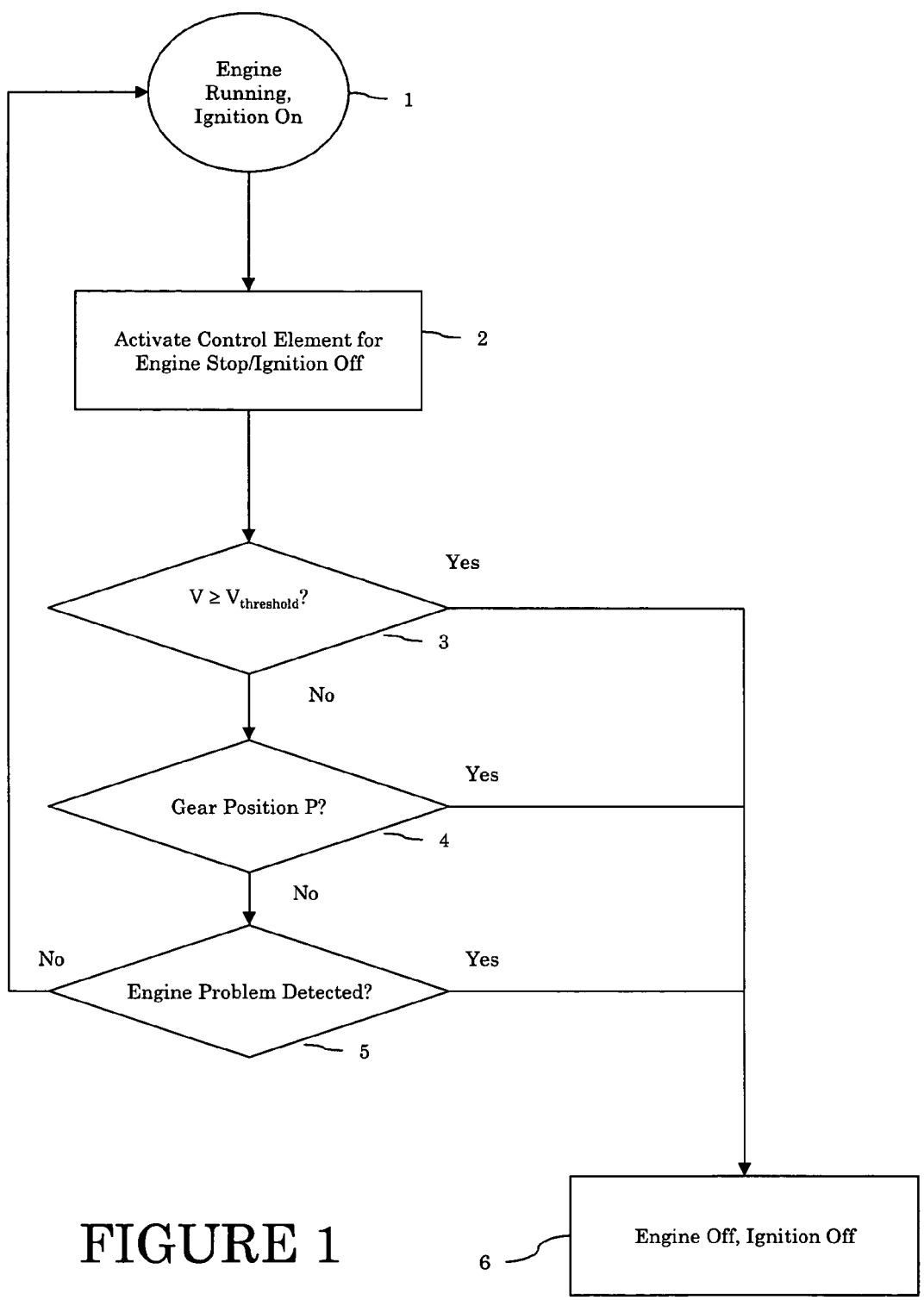
FIG. 1 is a flow chart illustrating the procedure of the invention.
Figure 2A:
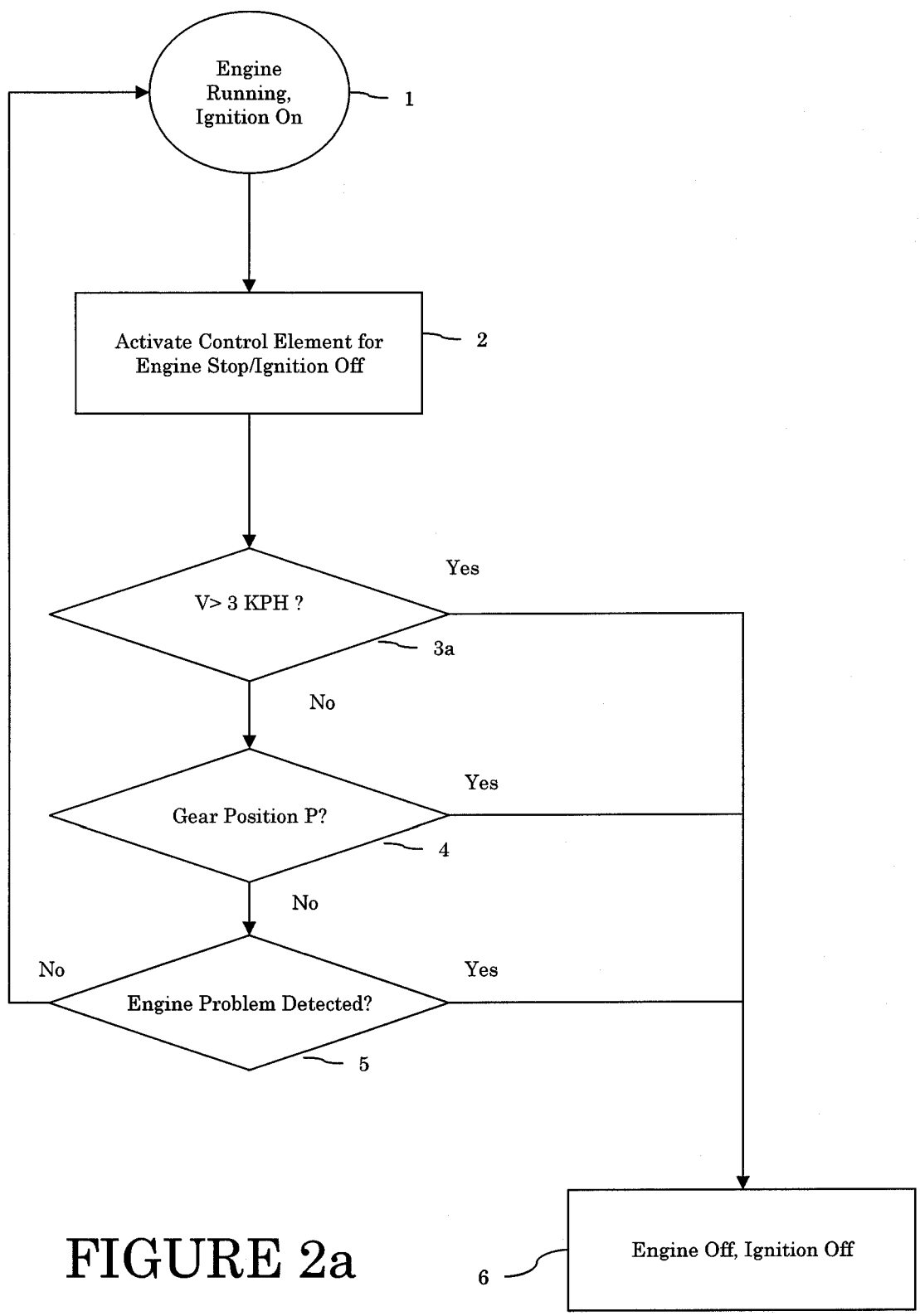
FIGS. 2a-2c are flow charts illustrating the procedure of the invention.
Figure 2B:
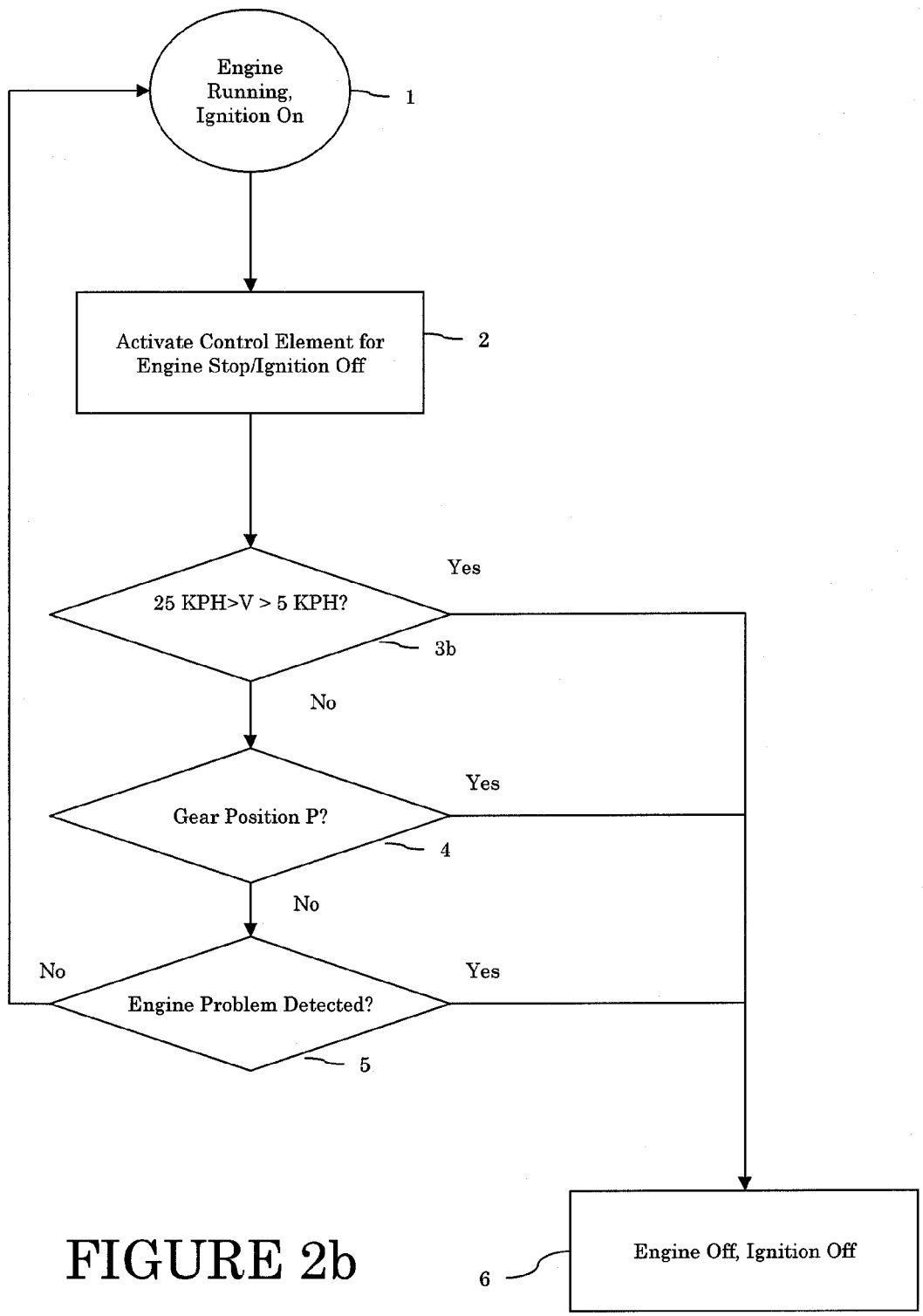
Figure 2C:
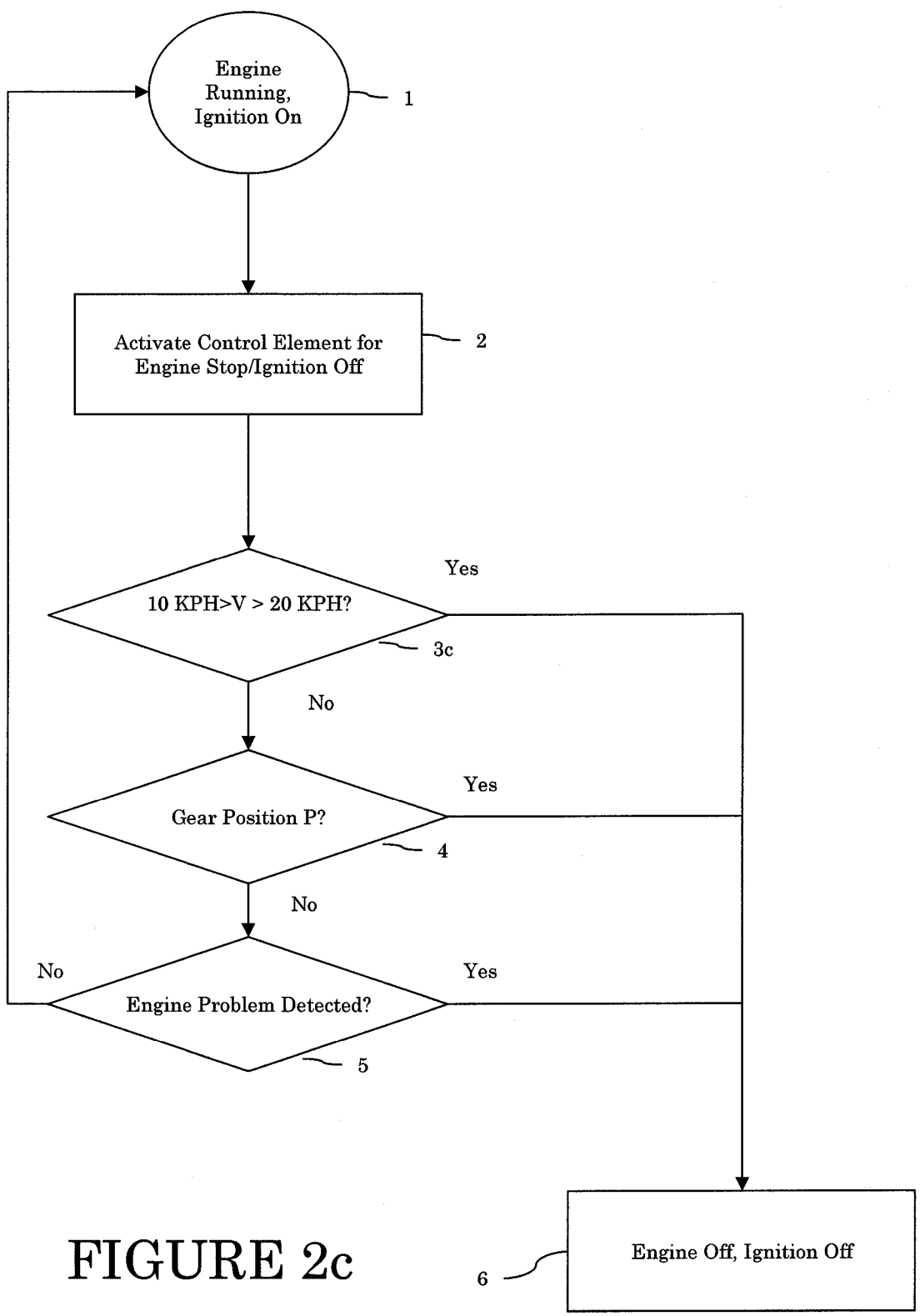

FIGS. 2a-2c respectively illustrate procedures in which the threshold speed is greater than 3 kilometers per hour, between 5 and 25 kilometers per hour, and between 10 and 20 kilometers per hour.

The solution provided by the present invention makes it possible for the vehicle to be moved in the gear position "N" for Neutral with the engine turned off, which may for example be necessary in the workshop or car wash. There are two ways to do this:

In the case of the first alternative, the ID transducer is not in a receptacle in the vehicle and is therefore, for example, in the driver's pocket. The driver engages the gear position "P" for Park, turns off the engine and ignition, switches the ignition back on again and engages the gear position "N" (possibly activating the brake at the same time). The vehicle can now be pushed manually, for example, or run through the car wash. To switch off the ignition, the gear position "P" has to be engaged again.

In the case of the second alternative, the ID transducer is in the receptacle in the vehicle provided for this purpose and locked in it in the manner known from the prior art. As a result, the engine and ignition can be turned off at any time and in any gear-select position. In the normal case, the engine is therefore turned off in position "D" for "Drive" and the "N" position is then engaged. The vehicle can now by pushed manually, for example, or run through a car wash. Subsequently, the ID transducer can only be taken out again if the gear position "P" is engaged.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Safety equipment to prevent a motor vehicle from moving after the engine is turned off,
   wherein the motor vehicle is equipped with a keyless starting system, which includes an identification transducer carried by a vehicle user and a control element for starting and stopping an engine,
   wherein the motor vehicle has an automatic transmission activated by a selection device and a gear position ("P") for Park can be selected along with other gear positions by a selector device,
   wherein the safety equipment includes
      an initial release device which allows the engine to be stopped and which is activated for release for vehicle speeds greater than a preset threshold speed, and
      a second release device which allows the engine to be stopped and which is activated for release if the vehicle's own controls detect an engine problem,
   wherein when the initial or second release devices are not activated, the engine can only be turned off when the gear position "P" for Park is selected.

2. Safety equipment according to claim 1, wherein the threshold speed is greater than 3 kilometers per hour.

3. Safety equipment according to claim 2, wherein the threshold speed is between 5 and 25 kilometers per hour.

4. Safety equipment according to claim 2, wherein the threshold speed is between 10 and 20 kilometers per hour.

5. A motor vehicle, comprising:
   a keyless starting system, which includes an identification transducer carried by a vehicle user and a control element for starting and stopping an engine,
   an automatic transmission activated by a selection device and a gear position ("P") for Park that can be selected along with other gear positions by the selection device, and
   safety equipment, which includes
      an initial release device which allows the engine to be stopped regardless of whether the gear position "P" for Park is selected, the initial release device being activated for release for vehicle speeds greater than a preset threshold speed, and
      a second release device which allows the engine to be stopped even when the gear position "P" for Park is not selected and the vehicle speed is less than the preset threshold speed, the second release device being activated for release if the vehicle's own controls detect an engine problem,
   wherein when the initial or second release device is not activated, the engine can only be stopped when the gear position "P" for Park is selected.

6. The motor vehicle according to claim 5 wherein the threshold speed is greater than 3 kilometers per hour.

7. The motor vehicle according to claim 6, wherein the threshold speed is between 5 and 25 kilometers per hour.

8. The motor vehicle according to claim 5, wherein the threshold speed is between 10 and 20 kilometers per hour.

* * * * *